Figure 1:
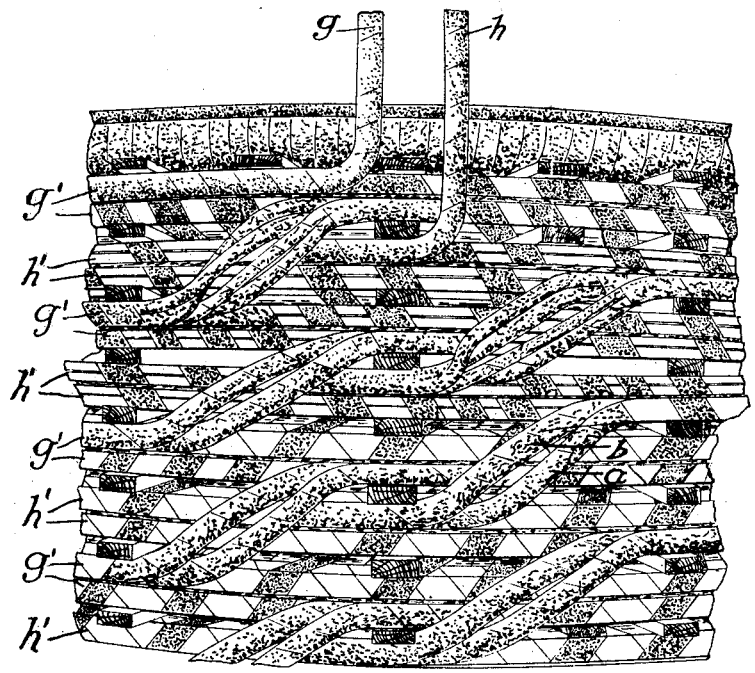

Dec. 29, 1931.  E. D. T. NORRIS  1,838,280
ELECTRIC TRANSFORMER
Filed July 6, 1928  2 Sheets-Sheet 1

Eric Douglas Tobias Norris
INVENTOR
By Marks & Clerk
Attys.

Patented Dec. 29, 1931

1,838,280

UNITED STATES PATENT OFFICE

ERIC DOUGLAS TOBIAS NORRIS, OF HOLLINWOOD, ENGLAND, ASSIGNOR TO FERRANTI, LIMITED, OF HOLLINWOOD, ENGLAND

ELECTRIC TRANSFORMER

Application filed July 6, 1928, Serial No. 290,731, and in Great Britain August 8, 1927.

This invention relates to electric transformers and has for its object to provide methods of and means for reducing eddy currents and circulating currents due to leakage flux.

In any transformer the reactance (or leakage) flux due to the ampere turns in the primary and secondary windings passes partly between these windings and partly through the windings themselves. That part of the flux which passes between the windings causes no losses in the copper due to eddy currents but that which passes through the windings sets up eddy current (or Foucault) losses in the turns of the windings, these losses being additional to the ohmic losses due to the load currents in the windings.

The present invention applies to all classes of transformer and all types of windings, but for purposes of illustration, the description given below refers particularly to core type transformers with concentric primary and secondary windings.

In this type of transformer the leakage flux is assumed to be parallel to the axis of the coils and the eddy current loss caused by this flux will depend upon the section of the conductor. The loss may be reduced in the first place by so shaping the conductor that its dimension in a direction normal to the direction of flux is small. Thus the conductor might be a thin strip with its minor dimension in the radial direction.

Again, where the current to be carried is large, the eddy current losses may be reduced by splitting up the conductor into several separate strands insulated from one another. By this means the eddy current losses in each separate strand are rendered small, but circulating currents set up between the different strands due to each strand interlinking with different amounts of leakage flux will not be prevented.

To reduce this circulating current loss, the strands are frequently transposed or crossed over so that each strand when considered over its whole length interlinks with an equal amount of leakage flux. In the case of core type transformers this transposition or crossing over is carried out in a radial direction.

In actual fact, however, the leakage flux in the transformer is not parallel to the axis of the coils throughout the whole length of the winding. In fact the flux returns either by the core or through the external air as indicated in dotted lines in Figure 2 of the accompanying drawings and curls over towards the end of the coils on its return path. At the two ends of the winding, therefore, the flux is not parallel to the axis, but possesses a strong radial component.

The correct shape and disposition of the conductor, and arrangement of crossovers, thus depend entirely on the direction of the leakage flux. I have found that the crossovers and dimensions hitherto adopted which serve to reduce the stray losses throughout the body of the windings are of no effect as regards the ends of the windings. In fact, shaping the conductor (e. g. by using a thin strip) in order to reduce the eddy current losses in the body of the winding, actually accentuates the losses in the ends of the winding as the major dimension of the conductor is now substantially normal to the direction of flux.

According to the present invention the conductors in the end zones of an electric transformer coil are subdivided and the constituent elements are crossed over in the dimension at right angles to the dimension in which the normal cross-overs are made in the main body of the winding. Thus if the normal crossing over at the central zone of the transformer coil is in an axial direction, then I cross over the constituent elements in a radial direction at the end zones of the transformer coil; likewise if the crossing over of the central zone is in a radial direction I cross over the elements of the end zones in an axial direction.

In the accompanying diagrammatic drawings:—

Figure 2:
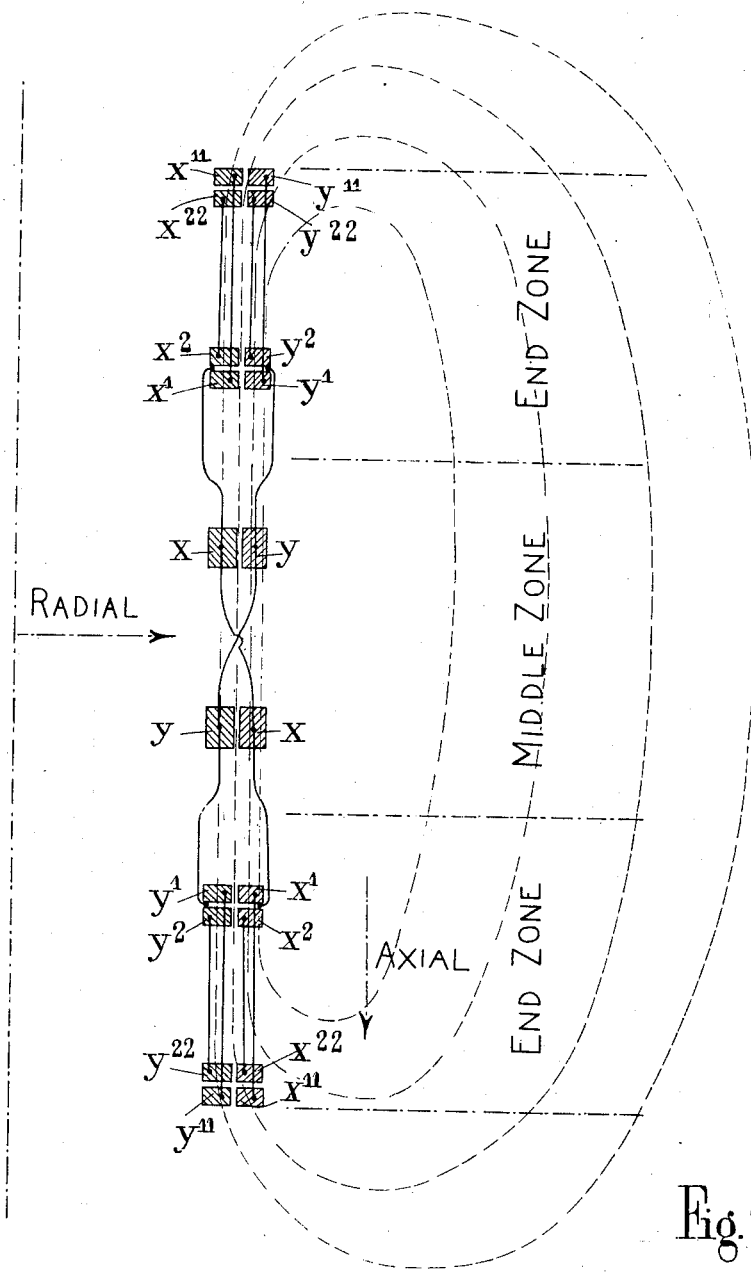

Figure 1 illustrates a portion of the top of one winding of a concentric winding transformer embodying the present invention in one form, while Figure 2 is a diagram illustrating a method of crossing over with leakage lines and coil zones indicated.

The accompanying drawings illustrate part of the upper end of the transformer embodying an inner primary winding and an outer concentric secondary winding, the latter only being visible in the drawings.

The secondary winding is actually formed of two sections commencing respectively at $g$ and $h$. Portions of the winding of the section commencing at $g$ may be traced at $g'$, while portions of the section commencing at $h$ may be traced at $h'$. The conductors at the lower end of the figure, i. e. at the middle portion of the whole secondary winding, are subdivided in a radial direction relative to the axis of said winding to form subdivided elements $a$, $b$ which respectively rest at different distances from the winding axis. These subdivided elements $a$, $b$ are interchanged in position (i. e. crossed over) in accordance with the usual practice in order to reduce leakage flux losses. In accordance with the present invention at the upper end of the winding and at the lower end (not shown) thereof an additional subdivision is performed; that is to say, the conductors are divided into further subdivided elements which are situated at different distances from either end of the secondary winding. These further subdivided elements are interchanged in position in relation to the ends of the secondary winding, whereby the circulating current losses in the end conductors due to the radial component of the leakage flux at these zones is reduced.

In Figure 2 one half of a simple concentric wound transformer coil is indicated having at its middle zone two conductors $x$ $y$ which are crossed over in the radial direction. Magnetic leakage lines are indicated by dotted lines and it will be seen that as these lines bend outwards in the end zones of the coil the conductors $x$ $y$ are subdivided into elements $x'$ $x^2$, $x''$ $x^{22}$, and $y'$ $y^2$, $y''$ $y^{22}$ respectively, which are crossed over in the axial direction. Thus $y'$ is connected to $y''$, $y^2$ to $y^{22}$ and $x'$ to $x''$ and $x^2$ to $x^{22}$ in the end zones.

In more complicated cases the conductors may be subdivided into more than two strands, and there may be several cross-overs of some or all of these subdivided strands. The number and nature of these cross-overs in each case will be determined on the same principles as normal cross-overs due to the leakage flux in the main body of the winding except that in accordance with the invention the cross-overs of subdivided strands in the end zones must be in a direction at right angles to the direction of the cross-overs in the middle part or zone of the winding.

In sandwich type windings where the direction of the leakage flux in the main part of the winding is radial in relation to the axis of the winding, the cross-overs in the main part of the winding will be in an axial direction and the cross-overs of the subdivided strands at the ends of the windings will be in a radial direction.

Having now described my invention, what I claim as new and desire to secure by Letters Patent is:—

1. An electric transformer coil embodying a middle zone and two end zones, conductors in said middle zone each constituted by a plurality of elements disposed each at a different distance from the axis of the coil and arranged mutually to interchange their radial positions, a conductor in said end zones constituted by a plurality of elements disposed side by side at different distances from either end of said coil and arranged mutually to interchange their position in relation to the ends of the coil.

2. An electric transformer coil embodying a middle zone and two end zones, conductors in all of said zones each constituted by a plurality of elements disposed each at a different distance from the axis of the coil and arranged mutually to interchange their radial positions, a conductor in said end zones constituted by a plurality of elements disposed side by side at different distances from either end of said coil and arranged mutually to interchange their position in relation to the ends of the coil.

3. An electric transformer coil embodying a middle zone and two end zones, conductors in said middle zone each constituted by a plurality of elements disposed side by side at different distances from either end of said coil and arranged mutually to interchange their position in relation to the ends of the coil, a conductor in said end zones constituted by a plurality of elements disposed each at a different distance from the axis of the coil and arranged mutually to interchange their radial positions.

In testimony whereof I have signed my name to this specification.

ERIC DOUGLAS TOBIAS NORRIS.